(12) United States Patent
Mathey et al.

(10) Patent No.: US 8,783,170 B2
(45) Date of Patent: Jul. 22, 2014

(54) COOKING APPLIANCE AND PIVOTAL DEVICE FOR RAISING AND LOWERING A BASKET FOR DRAINING COOKED FOOD

(75) Inventors: Olivier Mathey, Vonnas (FR); Pascal Dirand, Marsannay la Cote (FR)

(73) Assignee: SEB S.A., Ecully (FR)

( * ) Notice: Subject to any disclaimer, the term of this patent is extended or adjusted under 35 U.S.C. 154(b) by 1536 days.

(21) Appl. No.: 11/940,408

(22) Filed: Nov. 15, 2007

(65) Prior Publication Data
US 2008/0110349 A1 May 15, 2008

(30) Foreign Application Priority Data
Nov. 15, 2006 (FR) .................................. 06 09963

(51) Int. Cl.
*A47J 37/06* (2006.01)
*A47J 37/12* (2006.01)
*A47J 27/62* (2006.01)

(52) U.S. Cl.
USPC ............... 99/407; 99/403; 99/410; 99/330; 99/336; 426/389

(58) Field of Classification Search
CPC ... A47J 37/12; A47J 37/1219; A47J 37/1276; A47J 37/1295
USPC ............ 99/403, 407, 410, 330, 336; 426/389
See application file for complete search history.

(56) References Cited

U.S. PATENT DOCUMENTS

| | | | | |
|---|---|---|---|---|
| 2,907,659 | A * | 10/1959 | Anetsberger et al. | 426/438 |
| 3,430,553 | A * | 3/1969 | Di Pietro | 99/336 |
| 3,964,637 | A * | 6/1976 | Luebke et al. | 220/314 |
| 4,803,918 | A * | 2/1989 | Carbon et al. | 99/377 |
| 4,854,227 | A * | 8/1989 | Koopman | 99/416 |
| 5,746,117 | A * | 5/1998 | Chang | 99/407 |
| 5,768,994 | A * | 6/1998 | Bobo | 99/374 |
| 5,931,081 | A * | 8/1999 | Sham et al. | 99/336 |
| 5,937,742 | A * | 8/1999 | Steeb et al. | 99/375 |
| 6,006,658 | A * | 12/1999 | Siu | 99/336 |
| 6,250,213 | B1 * | 6/2001 | De'Longhi | 99/407 |
| 6,305,270 | B1 * | 10/2001 | Wang | 99/336 |
| 6,386,094 | B1 * | 5/2002 | Stevenson et al. | 99/410 |
| D465,965 | S * | 11/2002 | Dalton et al. | D7/352 |
| 6,523,457 | B1 * | 2/2003 | Ancona et al. | 99/330 |
| 6,834,578 | B1 * | 12/2004 | Wu Chang | 99/413 |
| 7,021,199 | B2 * | 4/2006 | Lubowicki et al. | 99/372 |

(Continued)

FOREIGN PATENT DOCUMENTS

| | | | |
|---|---|---|---|
| DE | 19641409 A1 | * | 4/1998 |
| FR | 2754163 A1 | | 4/1998 |

*Primary Examiner* — Dana Ross
*Assistant Examiner* — Brett Spurlock
(74) *Attorney, Agent, or Firm* — Browdy and Neimark, PLLC

(57) ABSTRACT

A device for raising and lowering a basket out of and into the tank of a cooking appliance. The device has a support adapted to rest on the cooking appliance and to be coupled to the basket for moving the basket with respect to the support between a raised position and a lowered position, and a handle mounted for movement between a first position to place the basket in the raised position, and a second position to place the basket in the lowered position. The support includes a hub mounted to have a certain degree of rotational freedom, together with the basket, with respect to the appliance about an axis extending in the direction of the basket, and the handle is connected to the hub for movement between the first position and the second position.

19 Claims, 7 Drawing Sheets

(56) References Cited

U.S. PATENT DOCUMENTS

| | | | |
|---|---|---|---|
| 7,036,425 B2* | 5/2006 | Chang | 99/336 |
| 7,180,034 B1* | 2/2007 | Oppenheimer | 219/386 |
| 7,500,427 B2* | 3/2009 | Rosenzweig | 99/407 |
| 2004/0154474 A1* | 8/2004 | Chan | 99/407 |
| 2004/0168583 A1* | 9/2004 | Riede | 99/495 |
| 2005/0050682 A1* | 3/2005 | Lubowicki et al. | 16/266 |
| 2005/0204929 A1* | 9/2005 | Rosenzweig | 99/403 |
| 2006/0213373 A1* | 9/2006 | Fernandez et al. | 99/349 |
| 2007/0034094 A1* | 2/2007 | Tatham | 99/450.2 |
| 2008/0124438 A1* | 5/2008 | Forte et al. | 426/389 |

* cited by examiner

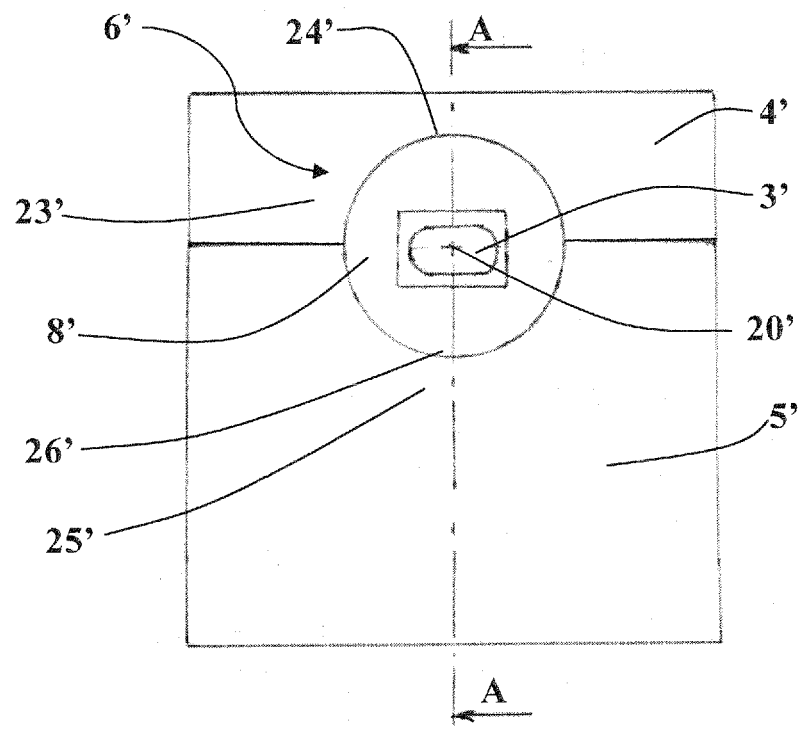
Fig 5a
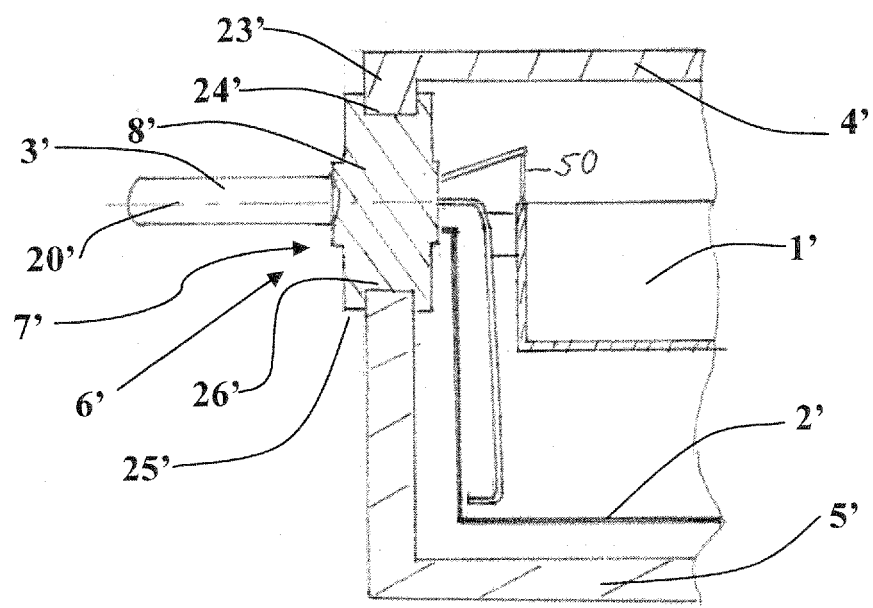
Fig 5b : A-A

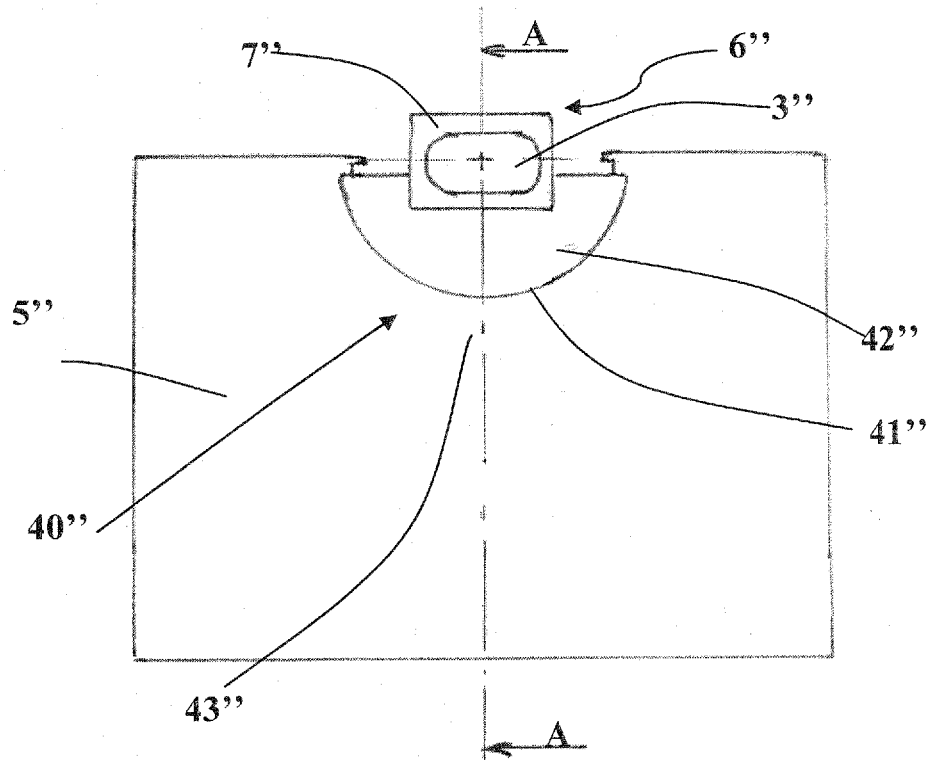
Fig 6a
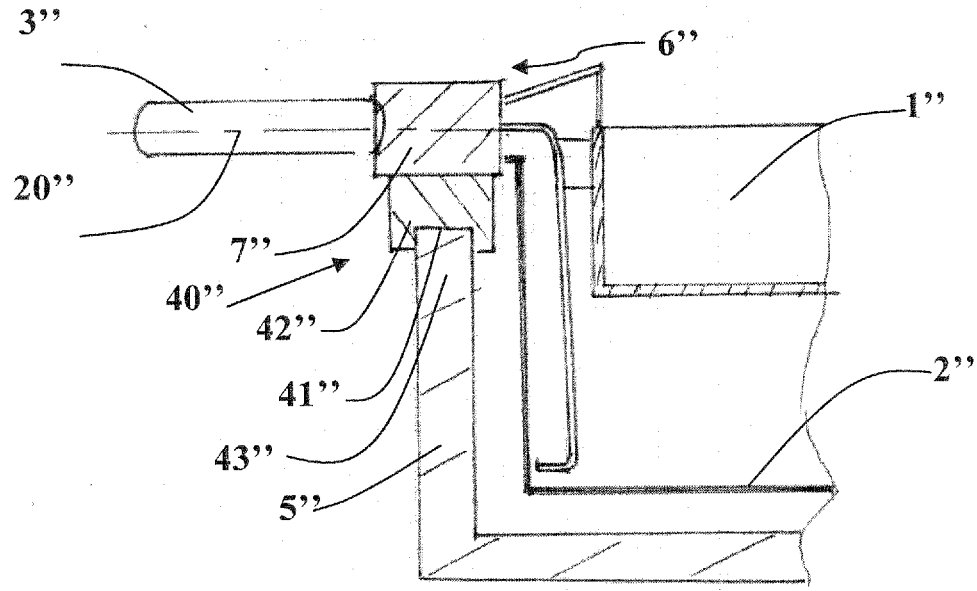
Fig 6b : A-A

COOKING APPLIANCE AND PIVOTAL DEVICE FOR RAISING AND LOWERING A BASKET FOR DRAINING COOKED FOOD

BACKGROUND OF THE INVENTION

The present invention relates to the field of cooking appliances having a cooking vessel intended to contain a cooking bath, and a cooking basket intended to contain food to be cooked.

The present invention relates more particularly to cooking appliances equipped with a device for raising and lowering the basket out of and into the vessel, and more particularly, but not exclusively, to electric fryers.

The present invention also concerns cooking appliances of the types cited above and/or devices for raising and lowering a basket of cooking appliances of the type described above.

In the field here under consideration, there are known fryers having a raising and lowering device that brings the basket containing the food being cooked, or which has been cooked, into a raised position, in which the food emerges from the cooking bath. In this position, excess oil, fat, or other fluid constituting the cooking bath can drain off under the influence of gravity. This technique is not very efficient because oil and fat tend to adhere to, and to be rapidly reabsorbed into, the cooked foods.

Known fryers, such as those disclosed in U.S. Pat. No. 6,834,578, U.S. Patent Publication No. 2004/154474 and Chinese Patent Publication No. 2489697 have a raising and lowering device equipped with a motor and an eccentric permitting the basket to be vibrated when in the raise position. Such devices permit the quantity of residual fatty material to be limited. However, they present the drawback that they are of complex and costly construction and are above all reserved for high end products.

BRIEF SUMMARY OF THE INVENTION

The present invention proposes to overcome the above-described drawbacks by providing, for use in a cooking appliance, a particularly simple and inexpensive device for raising and lowering a basket out of and into a tank of the cooking appliance while enabling the quantity of excess fat, or oil remaining on the food products after cooking to be easily reduced.

The present invention further provides a raising and lowering device of the type cited above that has an ergonomic structure.

A raising and lowering device according to the present invention also permits the achievement of a more homogenous cooking.

A device according to the present invention, in a cooking appliance, achieves maximum exploitation of the geometry of the tank, is reliable and functions with complete safety.

A raising and lowering device according to the invention is easy to clean.

The invention also relates to a cooking appliance having a novel raising and lowering device of the type described above.

Such a cooking appliance according to the invention, equipped with such a raising and lowering device, reduces the quantity of excess oil or fat remaining on the food after cooking and has a simple and inexpensive structure.

More specifically, the device according to the invention for raising and lowering a basket out of and into the tank of a cooking appliance, particularly a fryer, comprises a support adapted to rest on the cooking appliance, the basket being mounted to be moveable with respect to the support between a raised position and a lowered position, and a handle mounted for movement between a first position to place the basket in the raised position, and a second position to place the basket in the lowered position, wherein the support includes a hub mounted to have a certain degree of rotational freedom with respect to the appliance about an axis extending in the direction of the basket, and the handle is connected to the hub for movement between the first position and the second position.

In other words, the axis extends in a direction traversing one lateral face of the cooking appliance and is preferably transverse, or perpendicular, to the direction of movement of the basket between the raised and lowered positions.

This arrangement permits the provision of a raising and lowering device that allows rotation of the basket by manually producing a rotational movement that is simple and easy to effectuate. The basket, when raised above the bath, can be shaken by rotation of the handle around the axis in order to drain food products contained in the basket.

This arrangement also permits the user, by the intermediary of the handle, to rotate, or pivot, the basket without using a motor, this assuring that the structure will be inexpensive and be highly reliable.

Advantageously, the hub has a lower face comprising support means allowing a degree of rotational freedom, about the axis extending in the direction of the basket.

Advantageously, the handle is mounted on the hub to be moveable about a pivot axis that is transverse with respect to the axis extending in the direction of the basket.

This arrangement permits the handle to be moved out of the way when the basket is in the lowered position.

Advantageously, the hub has a cylindrical form.

This arrangement permits the rotational guide means to be provided in a simple manner on the hub.

Advantageously, the support includes a bearing in which the hub can pivot.

This arrangement permits the creation of a very compact mechanical assembly for the rotational movement. In addition, this arrangement makes it possible to provide a bearing having a face that is in large part closed at the side of the interior of the appliance, which permits an easy cleaning of this zone and a seal that is simple to create.

Advantageously, the hub and the bearing have abutments provided to limit the rotation of the hub with respect to the bearing.

This arrangement helps to produce an abrupt halt in the rotational movement of the basket, thus promoting a separation of excess grease or oil from the cooked food. By achieving a rotation of the basket in one sense up to one of the abutments and then rotation in the opposite sense up to the other abutment, the user repeating this sequence several times, excess grease or oil can be separated from the cooked food very easily.

This arrangement also permits the user to lift the basket to the raised position during cooking and to redistribute the food products being cooked in the raised basket by performing the rotation of the basket in alternating directions, as described above.

The limitation of the magnitude of the rotation also eliminates the need to provide the basket itself with a cover, or lid.

The limitation of the magnitude of the rotation also permits the provision of a basket having an opening of a size that is close to that of the tank.

Advantageously, the bearing has a lower conformation arranged transversely with respect to the axis.

This arrangement permits the creation of a raising and lowering device that is removable but that is very stable when it is placed on the edge of the appliance. This arrangement also permits the user to quickly recognize the placement zone for repositioning the raising and lowering device on the appliance.

The invention additionally provides a cooking appliance having a tank, a basket and a device for raising and lowering the basket out of and into the tank, wherein the raising and lowering device has the structural features described above.

The raising and lowering device can be removable from the tank of the cooking appliance.

Advantageously, the appliance has a housing that receives the tank and that is closed by a cover, or lid.

This arrangement permits the attainment of an appliance that is completely closed during cooking. The user can reduce the quantity of grease or oil adhering to the food at the end of cooking with complete safety, the excess grease or oil then being caused to drop back into the tank.

Advantageously, the bearing is disposed between the housing and the lid.

This arrangement allows the cooking appliance to have a very simply structure in order to enable the raising and lowering device to be removable after opening of the lid at the end of a cooking operation.

Advantageously, the conformation of the bearing rests on an upper edge of the tank.

This arrangement permits the attainment of a good stability for the raising and lowering device by bringing the basket as close as possible to the bearing point of the device on the edge of the appliance.

According to another embodiment, the cooking appliance has an upper edge forming a lower rotation guide for the hub.

This arrangement allows the cooking appliance to be given an even simpler structure by forming the lower half of the rotation guide for the raising and lowering device directly with the hub and the upper edge of the appliance without any additional parts.

Also advantageously, the lid has a lower edge forming an upper rotation guide for the hub.

This arrangement can complete the preceding arrangement. The upper half of the rotation guide of the raising and lowering device is formed directly with the hub and the lower edge of the lid.

According to another embodiment of the invention, the raising and lowering device includes a support provided to come to bear on the edge of the housing, the basket being mounted to be moveable with respect to the support between a raised position and a lowered position, and a handle mounted on the support to be moveable between a first position, in which the basket occupies the raised position, and a second position, in which the basket occupies the lowered position, and in which the appliance has a moveable reception element arranged on the upper edge of the housing, provided to carry the support. The moveable reception element imparts a degree of freedom of rotation of the support with respect to the appliance about an axis extending in the direction of the basket.

Advantageously, the moveable reception element is formed by a half-pivot mounted to be moveable in rotation in a half-bearing formed in the housing.

A half-bearing is understood to be an element that permits provision of a support, as well as a lower guide for the half-pivot. The guide could be completed by another half-bearing in the lid.

This embodiment differs from the preceding in that it permits simplification of the raising and lowering device by associating the rotation guide of the raising and lowering device with the cooking appliance. Thus, a standard raising and lowering device can be used.

The upper edge of the appliance could be part of the housing and/or the tank.

BRIEF DESCRIPTION OF THE DRAWINGS

FIG. 3a is a perspective view of the appliance of FIGS. 1 and 2, with the lid removed and the basket pivoted, or rotated, slightly in the clockwise direction when viewed from the left-hand side of FIG. 3a.

FIG. 5a is a simplified front pictorial view of a second form of construction of an appliance according to the invention.

FIG. 5b is a cross-sectional view taken along the line A-A of FIG. 5a.

FIG. 6a is a view similar to that of FIG. 5a of a further exemplary embodiment of an appliance according to the invention, the lid of the appliance being removed in FIG. 6a.

FIG. 6b is a cross-sectional view taken along line A'-A' of FIG. 6a.

DETAILED DESCRIPTION OF THE INVENTION

FIGS. 1-4 show a first embodiment of a cooking appliance with a raising and lowering device 6 according to the invention.

Figure 1:
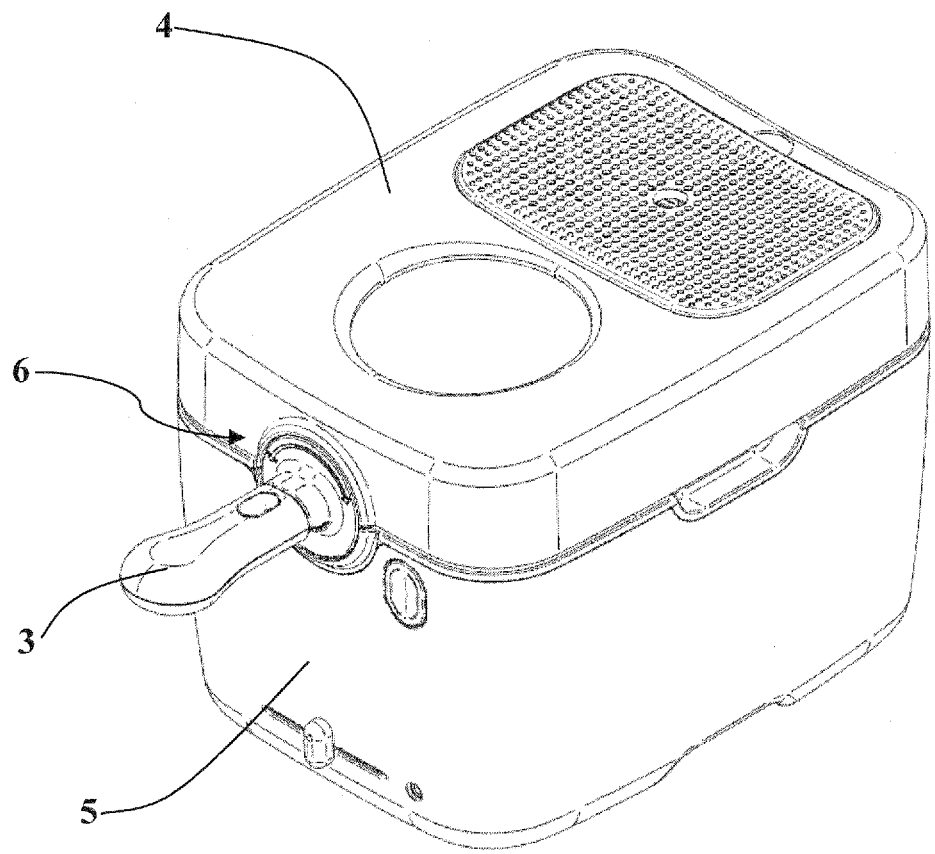
FIG. 1 is a perspective view of a first embodiment of an appliance according to the invention.
Figure 2:
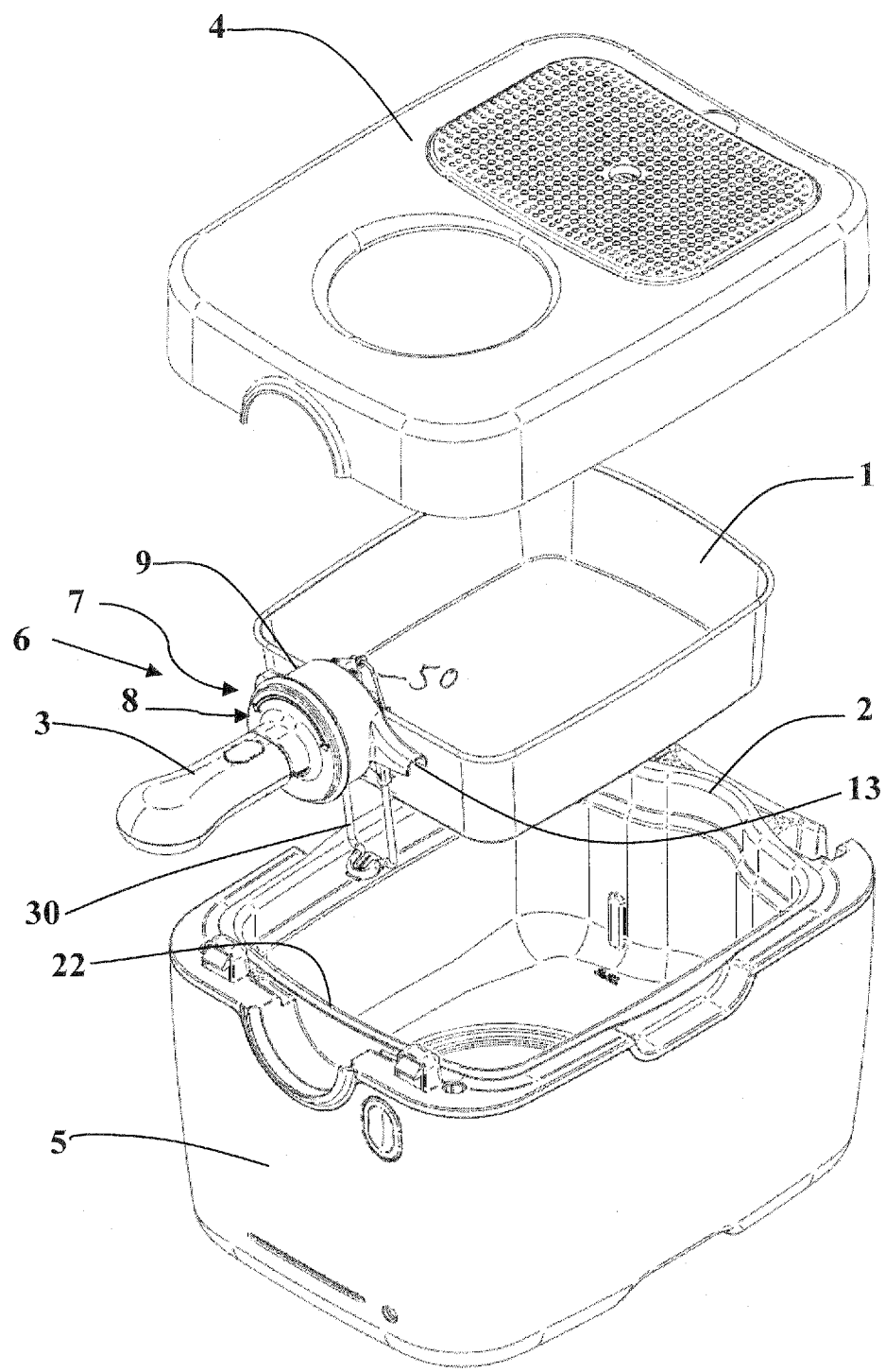
FIG. 2 is an exploded perspective view of the embodiment of FIG. 1.

As can be seen in FIGS. 1 and 2, the cooking appliance according to the invention includes a housing, or case, 5, a lid 4, raising and lowering device 6, a tank, or vessel, 2 and a basket 1, which is normally perforated. Device 6 for raising and lowering basket 1 rests on the upper edge of tank 2 and includes a slide member 30 along which basket 1 can slide in a vertical direction between a lowered position and a raised position. Basket 1 is provided with guide elements provided with openings through which the two vertical legs of slide member 30 extend in order to maintain basket 1 in the desired orientation as it moves between its raised and lowered positions. Device 6 includes a handle 3 that is mounted on a support 7 to be pivotable between a first position, in which handle 3 has a substantially horizontal orientation and places basket 1 in the raised position in tank 2, and a second position, into which handle 3 is pivoted by a downward movement from the horizontal orientation. In the second position, handle 3 has a substantially vertical orientation, with its free end pointing downwardly. This second position of handle 3 brings basket 1 into the lowered position in tank 2. In this way, basket 1 is mounted for movement relative to support 7 between the raised position and the lowered position.

Figure 4:
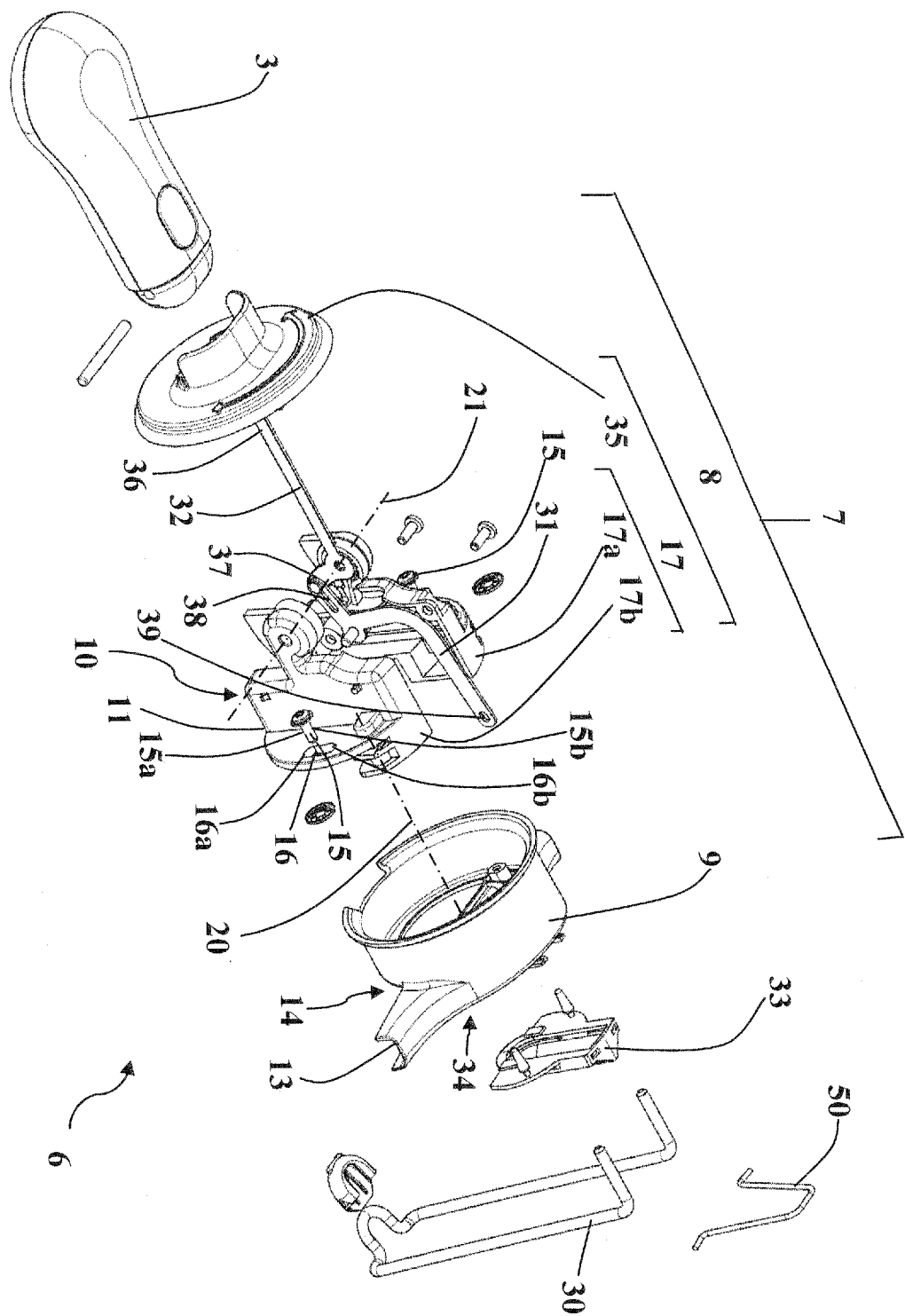
FIG. 4 is an exploded perspective view of the raising and lowering device according to the invention for the appliance in FIGS. 1-3b.
Figure 7:
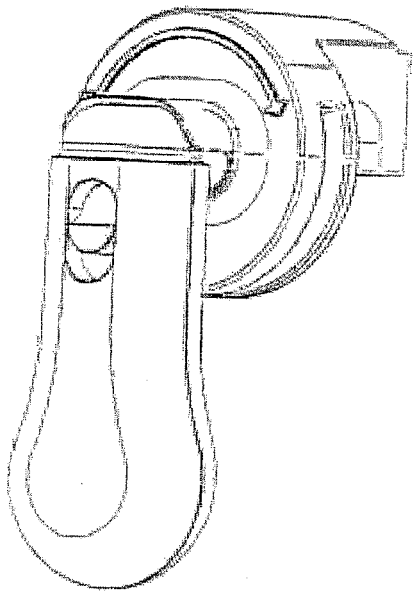
FIG. 7 is a detail view of the handle of the appliance in its lowered position.

According to the invention, an as can be seen in FIG. 4, support 7 includes a hub 8, which is given a degree of freedom of rotation with respect to the appliance about an axis 20 extending in the direction of basket 1. Hub 8 includes a base 17 that is divided into two parts 17a and 17b, a lever 31, articulated, or pivotally mounted, in base 17, and a transmission member 32 that is also pivotally mounted in base 17 to pivot about an axis 21. One end 36 of transmission member 32 extends into, and is fixed relative to, handle 3. The other end 37 of transmission member 32 cooperates with a slot 38 formed in one, end, or leg, of lever 31. The other end, or leg, of lever 31 has an opening 39 in which is installed a coupling means 50 that is connected to basket 1 (not shown in FIG. 4).

In the assembled device 6, handle 3 is secured by a pivot pin to base parts 17a and 17b so that pivotal movement of handle 3 between its horizontal position and its vertical position takes place, together with transmission member 32, about axis 21.

The free ends of coupling means 50 are secured to basket 1, for example at the upper edge thereof, by any appropriate attachment means.

Hub 8 has a lower face 10 provided with support means 11 that allow a degree of freedom of rotation about axis 20.

Thus, handle 3 is mounted on hub 8 to be moveable, or pivotable, between the first position, in which handle 3 has a substantially horizontal orientation, as shown in the drawings, and the second position, in which handle 3 has a substantially vertical orientation and extends downwardly from its pivot point. Slide member 30 is mounted on the interior face of hub 8, which face is directed toward the interior of the appliance.

Support 7 includes a bearing 9 within which hub 8 can rotate about axis 20. Bearing 9 has a lower face 14 provided to come to bear on tank 2 and housing 5. More particularly, bearing 9 has on lower face 14, a conformation, or shaped section, 13 extending transversely relative to axis 20. A sealing piece 33 made of a flexible material is secured on an external face 34 of bearing 9. In the embodiment shown in the drawings, slide member 30 is mounted to hub 8 by insertion of two horizontal legs at the top of slide member 30 into bores in hub 8.

Hub 8 also includes a mask, or cover, 35 disposed at the external side of base 17. One function of mask 35 is to assure that the region enclosed by bearing 9 remains hermetically sealed. Bearing 9 and mask 35 form a housing in which the two parts 17a and 17b of base 17 are housed. Handle 3 engages hub 8 in a manner such that hub 8 will pivot with handle 3 about axis 20.

According to one possible modification, external face 34 could belong to a part other than bearing 9.

Bearing 9 and hub 8 have abutment components 15a, 15b, 16a and 16b provided to limit the rotation, or pivot, angle of hub 8 about axis 20 with respect to bearing 9. Abutment components 15a and 15b are constituted by the upper and lower sides of each of two screws 15. Abutment components 16a and 16b are constituted by the upper and lower edges of each of two oblong slides 16 (only one of which is visible in FIG. 4).

In the assembled structure, each of screws 15 will be screwed into a threaded opening provided in the base of bearing 9.

As shown in FIG. 2, raising and lowering device 6 is disposed between housing 5 and lid 4. Lower conformation 13 of bearing 9 rests on upper edge 22 of tank 2.

Figure 3A:
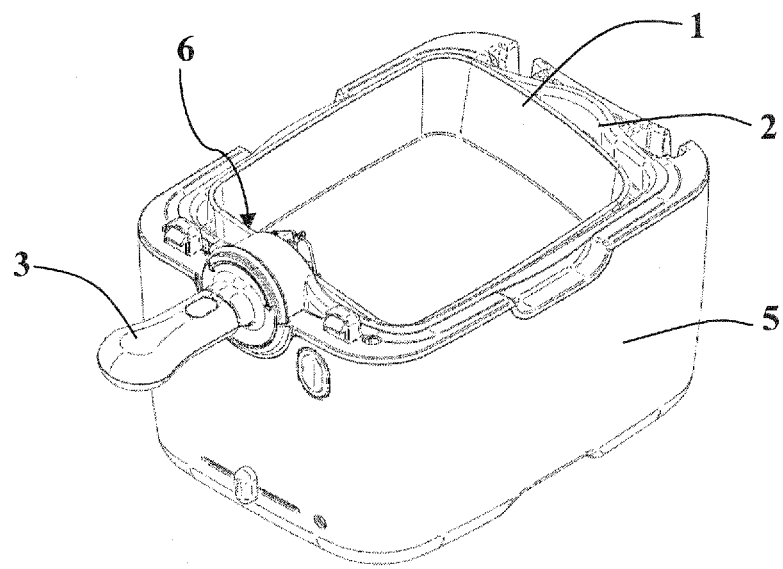

FIG. 3a shows device 6 and basket 1 in position in housing 5, with basket 1 being in its raised position and handle 3 thus being in its horizontal position. In the orientation shown in FIG. 3a, each abutment component 15b of bearing 9 bears against a respective abutment component 16b of hub 8, in which case handle 3 and basket 1 have been pivoted about axis 20 in the clockwise direction to an angle of between 5 and 20 degrees with respect to the horizontal, the angle preferably being 7.5 degrees.

Figure 3B:
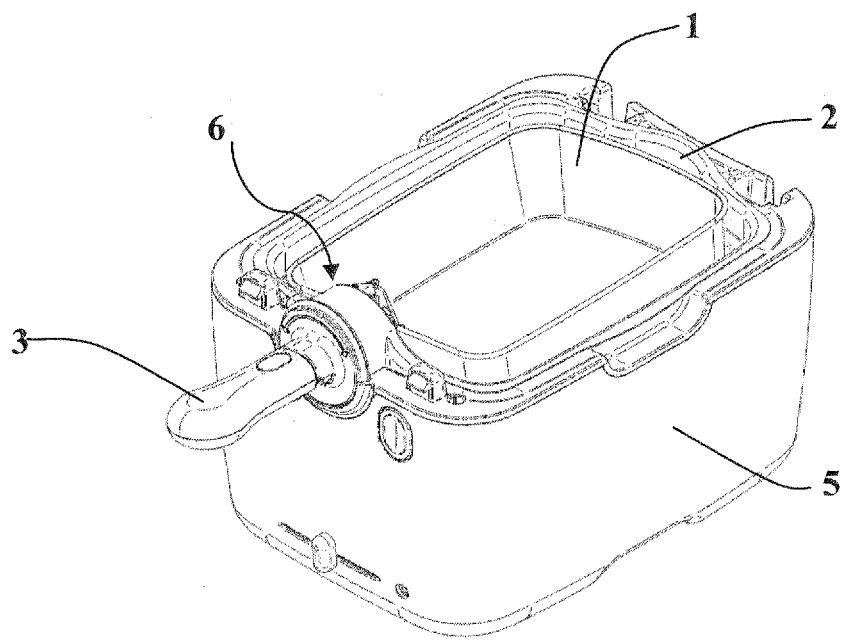
FIG. 3b is a view essentially identical to FIG. 3a, but with the basket pivoted slightly in the counterclockwise sense.

As is shown in FIG. 3b, handle 3 is also in the horizontal position and basket 1 again occupies its raised position. In the stage shown in FIG. 3b, handle 3 and basket 1 have been rotated in a counter clockwise direction until each abutment component 15a comes in the contact with an associated abutment component 16a, at which time handle 3 and basket 1 have been rotated through an angle of between 5 and 25 degrees with respect to the horizontal, and preferably an angle of the order of 7.5 degrees.

Slide member 30 includes at its lower end a pad that provides, once basket 1 is in place, a bearing point for slide member 30 against tank 1. The pad is made of a plastic that is inert relative to the internal lining of tank 1.

Basket 1 is removable from device 6, for example for cleaning. This capability can be provided by use of the connection arrangement disclosed the European patent document EP1152681. Basket 1 includes guiding means allowing the basket to a slide on slide member 30. Lever 31 is in operative association with, or coupled to, coupling means 50 for basket 1. Coupling means 50 is formed by a metal rod of circular cross section, whose central part is inserted through opening 39 of lever 31. On both sides of the central part, the rod has two bends to form legs that extend in the direction of basket 1. The ends of the rod that forms coupling means 50 are bent to come into engagement with lobes forming part of the guiding means for basket 1. Lever 31, coupling means 50 and basket 1 are thus directly connected together, which prevents basket 1 from separating from the displacement means as a result of experiencing a temporary impact, which separation could cause basket 1 to drop back into the cooking bath, resulting in splashing of the cooking bath. The user can remove basket 1 from slide member 30 by releasing the ends of coupling means 50 from the lobes belonging to the guiding means by simply pressing on the legs of coupling means 50.

The operation of the appliance and of raising and lowering device 6 according to the invention is the following:

after completion of a cooking cycle, which takes place in a cooking bath provided in tank 2 and with basket 1 in its lowered position and handle 3 pivoted downwardly, the user pivots handle 3 into its horizontal position, which brings basket 1, through the mechanism constituted by transmission element 32 and lever 31, into its raised position, during which time, the appliance remains closed;

the user can then pivot, or twist, handle 3 about axis 20 until abutment components 15b strikes abutment components 16b, at which time basket 1 is in the position shown in FIG. 3a. The result is that basket 1 stops abruptly and this promotes a detachment of some of the fat or oil from the food that has been cooked. By pivoting the handle in the other sense, until abutment components 15a strike components 16a, thus bringing basket 1 into the position shown in FIG. 3b, there is again provoked an abrupt stop of basket 1, resulting in the detachment and removal of more of the excess fat or oil present on the cook food;

by repeating these operations several times in succession, the user can reduce in a substantial manner the quantity of residual fat or oil remaining on the cooked food;

the user can then remove lid 4 and recover the cooked food by lifting handle 3, device 6 and basket 1 up of and away from housing 5. After the cooked food has been removed from basket 1, the user can place conformation 13 of the raising and lowering device back onto the upper edge of tank 2.

The user can use the same operating procedure during a cooking operation in order to redistribute the food items being cooked, for example between two excessive immersions of basket 1 into the cooking bath, and then return handle 3 to its lowered, vertical position, thus bringing basket 1 back into its lowered position.

According to another alternative, not shown, support 7 can rest solely on housing 5 or solely on tank 2.

The embodiment shown in FIGS. 5a and 5b includes a cooking appliance having a casing 5', a lid 4', a device 6' for raising and lowering a basket 1' out of and into a tank 2'. Raising and lowering device 6' includes a support 7' and a handle 3'. Support 7' includes a hub 8', but no bearing.

This embodiment differs from the first embodiment, illustrated in FIGS. 1-4, in that housing 5' has an upper edge 25' forming a lower guide 26' for the rotation of hub 8' around axis 20', axis 20' extending in the direction of basket 1'. More particularly rotational guide 26' is formed in the upper edge 25' of the housing. The appliance illustrated in FIGS. 5a and 5b also differs from the first embodiment in that lid 4' has a lower edge 23' forming an upper guide 24' for the rotation of hub 8'.

Basket 1' has a lower part that comes in contact with tank 2' and limits the movement of basket 1' during rotation of handle 3' about axis 20'.

Hub 8' is associated with closing means (not shown in detail) that provide a sealed enclosure for hub 8'.

According to an alternative of this embodiment, which is not illustrated, the lower guide for the rotation of the hub could rest at least partially on the upper edge of the tank.

According to another embodiment illustrated in FIGS. 6a and 6b, the cooking appliance includes a housing 5", and a device 6" for raising and lowering a basket 1" out of and into a tank 2". Device 6" has a support 7" provided to come to bear on the edge of housing 5", and a handle 3" mounted on support 7" for movement between the horizontal position in which basket 1" in its raised position, and a vertical position in which basket 1" occupies its lowered position. Thus, basket 1" is mounted to be moveable with respect to support 7" between the raised position and the lowered position, just as in the embodiments shown in FIGS. 1 to 5b. The embodiment shown in FIGS. 6a and 6b differs from the preceding embodiments in that housing 5" has a moveable receiving element 40" arranged on an upper edge 43" of housing 5". Element 40" is provided to carry support 7". Element 40" permits a limited freedom of rotation for support 7" with respect to the appliance about an axis 20" extending in the direction of basket 1".

Element 40" is formed by a half-pivot element 42" mounted to pivot in a half-bearing 41" formed by housing 5". More particularly, half bearing 41" is provided to come to bear on housing 5".

Basket 1" has a lower part that comes to bear against tank 2" and limits the movement of basket 1" during rotation of handle 3" about axis 20".

According to an alternative of this embodiment, which is not illustrated, the half-bearing can be provided at least partially in the upper edge of the tank.

According to another alternative, raising and lowering device 6" can have another type of transmission such as a transmission employing levers to displace the basket under control of the handle. The basket is not necessarily guided by a slide. The basket can for example be displaced by a raising and lowering device provided with a parallelogram.

According to another alternative, the appliance according to the invention does not necessarily have a lid.

According to yet another alternative, the tank of the appliance according to the invention is not necessarily fixed in the housing.

This application relates to subject matter disclosed in French Application number FR 06 09963, filed on Nov. 15, 2006, the disclosure of which is incorporated herein by reference.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A device for raising and lowering a basket out of and into a tank of a cooking appliance, said device comprising a support adapted to rest on the cooking appliance, the basket being mounted to be movable with respect to the support between a raised position and a lowered position, said device further comprising: a handle having a longitudinal axis and mounted for pivotal movement about a pivot axis transverse to the longitudinal axis between a first position to place the basket in the raised position, and a second position to place the basket in the lowered position; and a lever mechanism connected between said handle and the basket to perform a pivotal movement that moves the basket between the raised position and the lowered position in response to movement of said handle between the first and second positions, wherein said support includes a hub coupled to the handle and to the basket in order to rotate the basket in unison with rotation of the handle, with respect to the appliance, about the longitudinal axis of said handle transverse to said pivot axis, the longitudinal axis extending in the direction from the handle to the basket, and said handle is connected to said lever for movement relative to said hub about the pivot axis between the first position and the second position.

2. The device of claim 1, wherein said hub has a lower face comprising support means allowing a degree of rotational freedom for said hub, about the longitudinal axis.

3. The device of claim 1, wherein said handle is mounted on said hub to be moveable about the pivot axis.

4. The device of claim 1, wherein said hub has a cylindrical form.

5. The device of claim 1, wherein said support includes a bearing in which said hub can pivot.

6. The device of claim 5, wherein said hub and said bearing have abutments provided to limit the rotation of said hub with respect to said bearing.

7. The device of claim 6, wherein said bearing has a lower conformation arranged transversely with respect to the longitudinal axis.

8. The device of claim 5, wherein said bearing has a lower conformation arranged transversely with respect to the longitudinal axis.

9. A cooking appliance comprising: the tank; the basket; and the device defined in claim 1 for raising and lowering the basket out of and into said tank.

10. The appliance of claim 9, further comprising: a housing that receives said tank; and a lid for closing said housing.

11. The appliance of claim 10, wherein said support of said device includes a bearing in which said hub can pivot and said bearing is disposed between said housing and said lid.

12. The appliance of claim 11, wherein said hub and said bearing of said device have abutments provided to limit the rotation of said hub with respect to said bearing, said bearing has a lower conformation arranged transversely with respect to the longitudinal axis, and said conformation of said bearing rests on an upper edge of said tank.

13. The appliance of claim 10, wherein said appliance has an upper edge forming a lower rotation guide for said hub.

14. The appliance of claim 13, wherein said lid has a lower edge forming an upper rotation guide for said hub.

15. The appliance of claim 10, wherein said lid has a lower edge forming an upper rotation guide for said hub.

16. The appliance of claim 10, wherein said appliance has an upper edge forming a lower rotation guide for said hub.

17. A cooking appliance comprising: a housing having an upper edge; and a device for raising and lowering a basket out of and into a tank of the cooking appliance, said device comprising a support adapted to rest on said upper edge of said housing, the basket being mounted to be moveable with respect to the support between a raised position and a lowered position, said device further comprising a handle having a longitudinal axis extending between the basket and the handle and mounted for movement about a pivot axis transverse to the longitudinal axis between a first position to place the basket in the raised position, and a second position to place the basket in the lowered position; and a lever mechanism connected between said handle and the basket to perform a pivotal movement that moves the basket between the raised position and the lowered position in response to movement of said handle between the first and second positions, wherein said appliance further comprises a moveable reception element arranged on said upper edge of said housing, provided to carry said support, and wherein said moveable reception element is coupled to said support, to the basket and to the handle in order to rotate said moveable reception element, said support and the basket in unison with rotation of the handle with respect to said housing about the longitudinal axis.

18. The appliance of claim 17, wherein said moveable reception element is formed by a half-pivot mounted to be moveable in rotation in a half-bearing formed in said housing.

19. The appliance of claim 1, wherein said pivot axis is located in said hub.

\* \* \* \* \*